Figure 1:
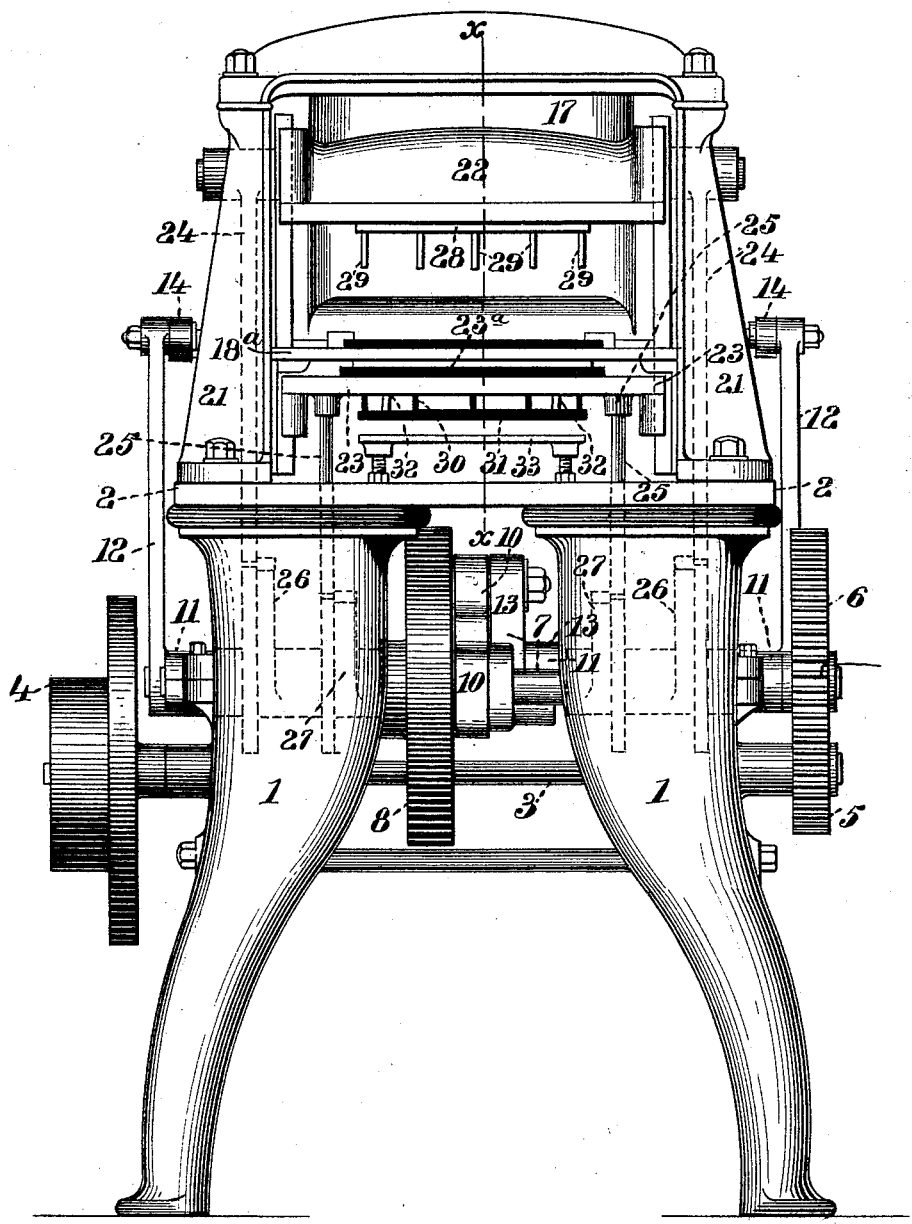

(No Model.) 5 Sheets—Sheet 1.
A. F. MADDEN.
MACHINE FOR MOLDING SEPARATOR PLUGS FOR BATTERY ELEMENTS.
No. 446,873. Patented Feb. 24, 1891.

Witnesses
Wm. J. Tanner
A. J. Tanner

Inventor
Albert Franklin Madden
by his attorney
J. H. Hubbard

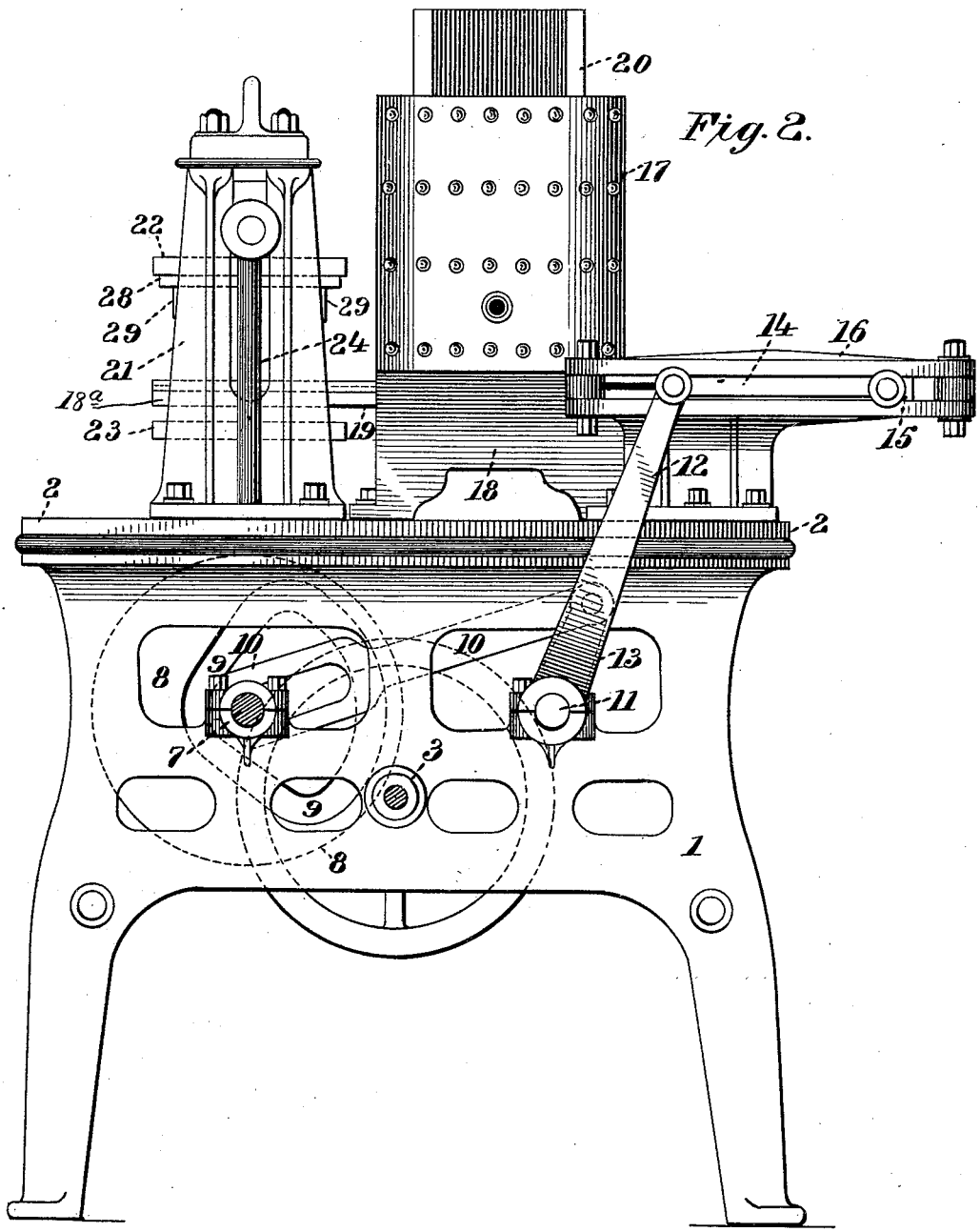

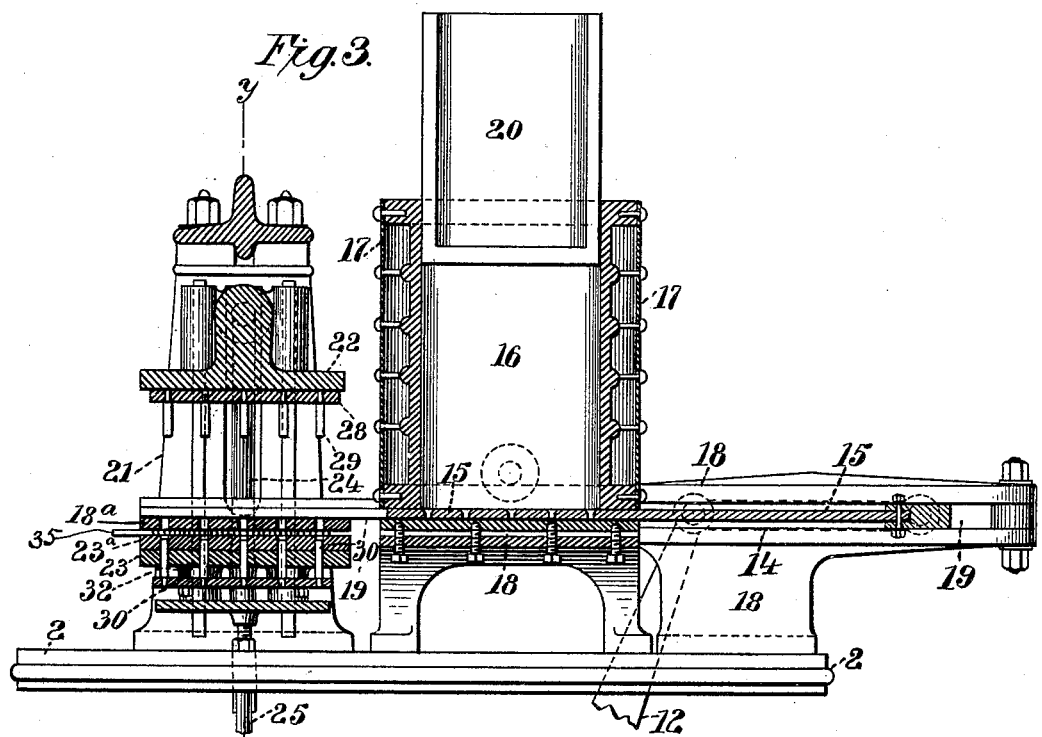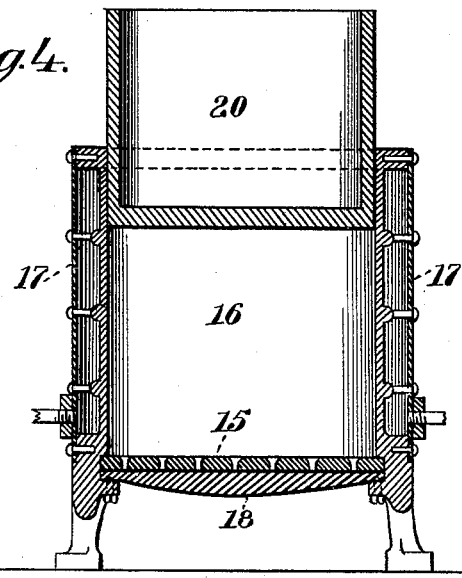

(No Model.) 5 Sheets—Sheet 4.
A. F. MADDEN.
MACHINE FOR MOLDING SEPARATOR PLUGS FOR BATTERY ELEMENTS.
No. 446,873. Patented Feb. 24, 1891.
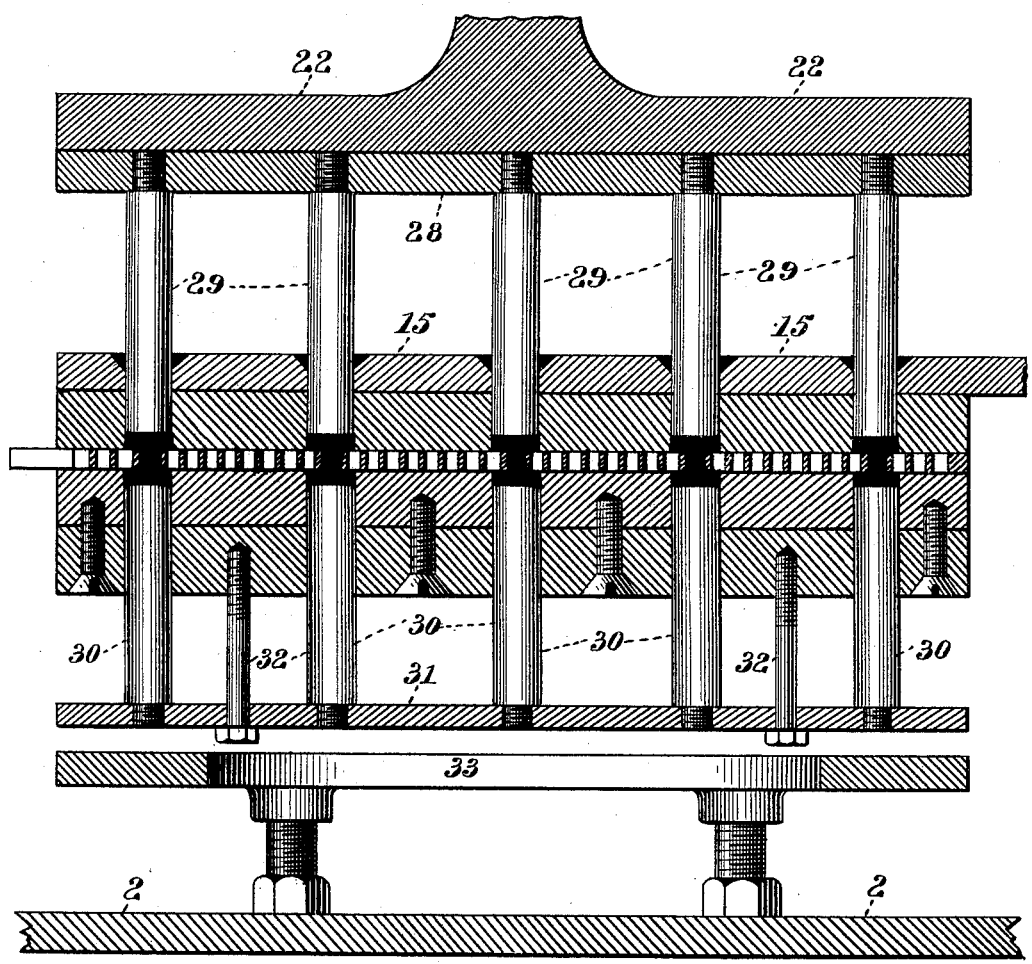
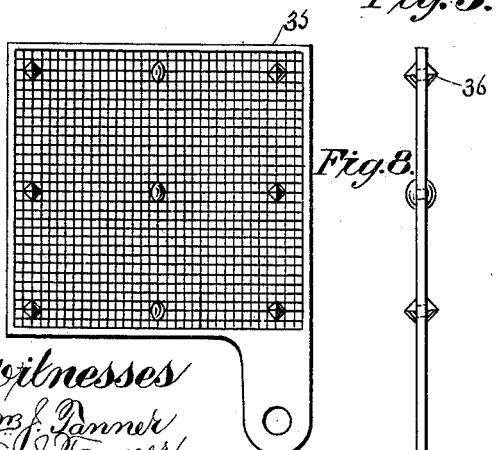
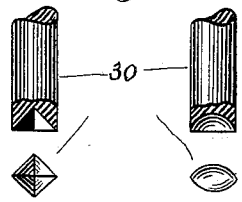

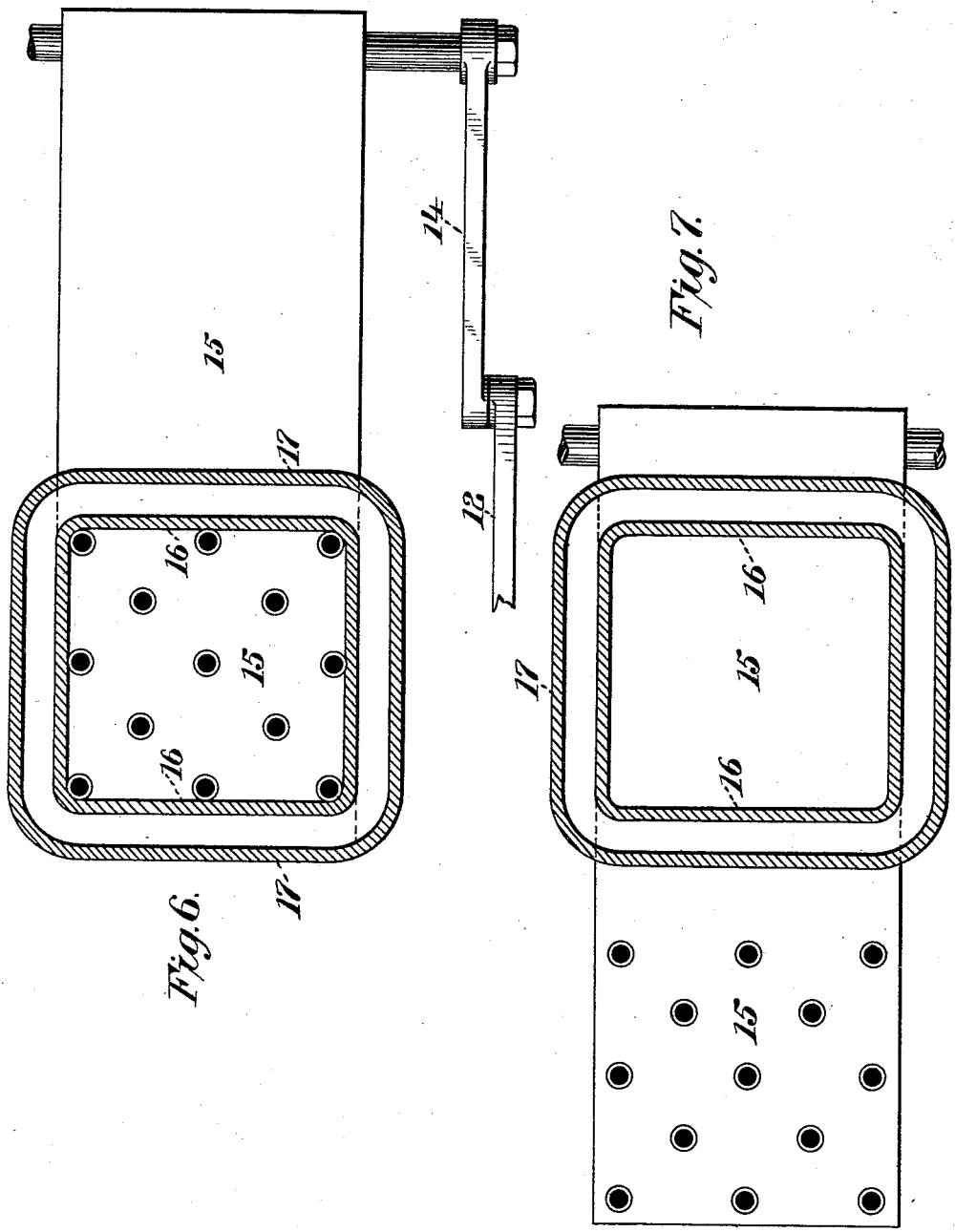

UNITED STATES PATENT OFFICE.

ALBERT FRANKLIN MADDEN, OF NEWARK, NEW JERSEY, ASSIGNOR, BY MESNE ASSIGNMENTS, TO JOHN M. PENDLETON, OF NEW BRIGHTON, NEW YORK.

MACHINE FOR MOLDING SEPARATOR-PLUGS FOR BATTERY ELEMENTS.

SPECIFICATION forming part of Letters Patent No. 446,873, dated February 24, 1891.

Application filed March 17, 1890. Serial No. 344,134. (No model.)

*To all whom it may concern:*

Be it known that I, ALBERT FRANKLIN MADDEN, a citizen of the United States, residing at Newark, in the county of Essex and State of New Jersey, have invented certain new and useful Improvements in Machines for Molding Separator-Plugs for Battery Elements; and I do hereby declare the following to be a full, clear, and exact description of the invention, such as will enable others skilled in the art to which it appertains to make and use the same.

My invention relates to certain new and useful improvements in machines for making and inserting separator-plugs for the elements of secondary batteries; and the objects of my invention are to permanently affix to the alternate plates (preferably to each negative element) a plurality of plugs of some refractory material of such shape as to afford little if any lodgment for matter precipitated from the battery solution, and which shall be identical in size, and shall therefore keep the elements so separated that their surfaces shall be retained in perfect parallelism.

Furthermore, it is the object of my invention to make and insert simultaneously the whole number of these plugs required for each plate in such manner that said plugs shall form a part of and shall not be capable of removal from the element to which they are affixed; and with these ends in view my invention consists in the construction and combination of co-operating mechanical elements hereinafter fully set forth, and then recited in the claims, and also in the method of inserting and forming the plugs upon the plates or grids.

In order that those skilled in the art to which my invention appertains may fully understand my invention and the construction and operation thereof, I will describe the same in detail, reference being had to the accompanying drawings, which form a part of this specification, and in which—

Figure 1 is a front elevation of my machine; Fig. 2, a side elevation, the gears being removed; Fig. 3, a central vertical longitudinal section; Fig. 4, a detail section through the die-plates, loader-plate, and ejector; Fig. 5, an enlarged detail section, line $y$ $y$ of Fig. 3; Fig. 6, a detail plan showing the perforated part of the loader-plate beneath the kettle; Fig. 7, a similar view showing the perforated part of the loader-plate in its forward position; Fig. 8, details showing plugs as attached to a grid; Fig. 9, detail sections showing dies adapted to form the plug-heads.

Like reference-numbers denote the same parts in all the figures of the drawings.

1 represents the frame upon which the machine is supported, and 2 is the bed mounted upon the top of the frame.

3 is the main shaft, journaled transversely in the frame and having a suitable band-wheel 4. By means of a pair of gears 5 6 power from the main shaft is imparted to a second transverse shaft 7. The shaft 7 has at its center a wheel 8, having therein a cam-groove 9, which latter engages and operates a connecting-rod 10 by means of a stud on the latter. Said connecting-rod at its rear end is yoked over the shaft 7, so that the motion which it derives from the cam is a lengthwise thrusting movement. From a rock-shaft 11, journaled in the frame, are extended upward and backward two arms 12, one at each end of said shaft, and at the center of said shaft is a crank-arm 13, to which the connecting-rod heretofore referred to is pivotally secured. These arms are connected through links 14 to the sliding loader-plate 15 and serve to operate the same, as will hereinafter fully appear.

Mounted upon standards secured to the bed of the machine a little behind the center thereof is a kettle 16 for holding the material of which the plugs are to be made, and 17 is a jacket arranged around said kettle, leaving an intervening space for steam circulation, whereby heat is applied to the contents of the kettle. The bottom of said kettle is open, as is shown in Figs. 4 and 5.

18 is a table or support for the loader-plate, and 19 are ways in which said plate may slide longitudinally of the machine. This support and the ways are so arranged as to permit to the loader-plate a free traversing movement across the open lower end of the kettle and to its forward end a guided entrance between the forming-dies.

18ª is another support in the same horizontal plane as the support 18. This support 18ª is secured between the standards and serves to support the front end of the loader-plate when the latter is in its forward position ready to deliver its material. Said support is provided with apertures, through which the upper dies may descend.

The loader-plate 15 (see Fig. 5) is a little wider than the open lower end of the kettle and is somewhat more than twice as long as the length of said kettle from front to rear. In its front portion are formed openings equal in number to the plugs desired to be put in the plate, and preferably countersunk or tapered from the top of the plate downward, although they may be made of equal diameter throughout. The rear portion of the plate is imperforate.

A weight 20 or similar device is arranged in the kettle for the purpose of exerting constant pressure to force the contents thereof downward, as will be hereinafter more fully explained.

Mounted upon the bed in front of the kettle are standards 21, which are provided with vertical ways, and in said ways are two cross-heads 22 23, movable toward and from each other by means of pitmen 24 25, operated by cams 26 27 on the transverse shaft 7. Arranged upon the upper cross-head 22 is a die-plate 28, having thereon depending dies 29, equal in number to the plugs to be inserted in the plate and corresponding in position to the perforations in the loader-plate. The faces of these dies are concaved in the shape of the plug-heads to be made. (See Figs. 8 and 9, which show dies for various conformations of plugs.) The lower cross-head has a platen 23ª pierced to correspond with the dies upon the upper cross-head; but the dies 30, which operate through and in conjunction with said platen, are loose in the holes and have their lower ends firmly secured in a die-plate 31, hung from the platen by means of screws 32, which pass loosely through it and are threaded into the bottom of the platen. Beneath this die-plate and arranged upon the bed is a table 33, upon which the die-plate last referred to may descend with the platen; but this table is open, so that the screws 32 may pass through, thereby as the platen descends, raising the die-plate relative to and projecting the dies upward through said platen, for the purpose hereinafter explained.

In the operation of my machine the kettle is filled with the material of which the plugs are to be made, preferably a mixture of asbestus, Stockholm tar, and bitumen. This is kept in a plastic state by means of the steam-jacket, and is forced downward by means of the weight. When the loader-plate is at its backward limit of movement, the perforated portion thereof is beneath the open bottom of the kettle, (see Fig. 5,) and the pressure of the weight forces the plastic material into the holes of the loader-plate and fills them. Meanwhile the cross-heads are separated and the machine is at rest. Then one of the negative battery elements or grids to be plugged is laid in position on top of the upwardly-projecting lower dies. The grid is designated in the drawings by number 35. When the machine is started, and by means of the rock-arms, the loader-plate is moved forward along the ways on the table until its pierced end is between the two sets of dies, with the holes therein corresponding with said dies. This brings the imperforate rear portion of the plate beneath the kettle and prevents the escape of the contents of the latter. Then the cross-heads are caused by their pitmen to approach each other. As the upper dies descend they pass through the perforations in the loader-plate, carrying the material which the perforations contained downward toward the element to be plugged. Meanwhile the lower cross-head is raised, and the dies sink relative thereto until their upper ends are below the surface of the platen in the position shown at Fig. 4, when the grid to be plugged lies upon the upper surface of the platen. (See Fig. 3.) Then the pressure of the two sets of dies forces the plastic material through the interstices of the grid and molds it into plugs having heads corresponding to the shape of the surfaces of the dies. When this operation has been accomplished, the dies recede, and as the platen descends the lower die-plate is arrested by the table, and the plugged plate is left supported upon the ends of the lower dies, whence it may be removed by hand and another laid in place thereof.

By means of this machine each grid or element may be provided with plugs which are identical in size and shape, and which will therefore keep the elements of an assembled battery perfectly parallel. This is by no means the case with the soft-rubber plugs commonly used, and the result of the use of plugs of varied length is that the elements are liable to become distorted when the battery is in operation.

By use of dies of different conformation the plugs may be molded with heads of any desired shape—as triangular, diamond, or double elliptic. A grid having plugs with heads of various shapes and numbered 36 are shown in Fig. 8.

In this my invention I do not wish to be confined to the details of construction herein shown and described, since many minor changes involving only mechanical skill may be made therein without departing from the general combinations of elements now to be set up in the claims.

I claim—

1. In a machine of the character described, the combination, with the two co-operating dies adapted to form the plug-heads, of a perforated loader-plate, means for filling the same, and further means for projecting said plate between the dies for the discharge of its contents, substantially as set forth.

2. In a machine of the character described, the combination, with two sets of co-operating molding-dies having their faces conformed to the shape of the plug-heads to be produced, of a movable loader-plate, a suitable receptacle, as the kettle, opening against and adapted to discharge into said loader-plate, means for forcibly ejecting the contents of the kettle, mechanism for operating the loader-plate into position for discharge, and further mechanism for securing the proper movement of the dies.

3. In a machine of the character described, the combination, with the perforated loader-plate and means for filling the holes with the material to be worked, of a pair of forming-dies and means for projecting one of said dies through the loader-plate, whereby the contents of said plate is positively discharged, substantially as specified.

4. In a machine for molding separator-plugs for battery elements, the combination, with the open-bottomed kettle, of the reciprocating loader-plate having movement beneath said kettle, the two sets of molding-dies arranged one above the other, means, as described, for projecting the loader-plate forward into the field of operation of the molding-dies, and further means for the actuation of said dies toward and from each other, as set forth.

5. The combination, in a machine of the character described, with the kettle, the reciprocating loader-plate, and the upper die-plate and dies, of the platen, the lower dies loose therein and secured at their lower ends to the die-plates suspended from the platen, and the ejector-table arranged beneath the die-plate last referred to, substantially as set forth.

6. In a machine of the character described, the combination, with the kettle, of a perforated loader-plate having movement across the bottom of the kettle, means for reciprocating said loader-plate, and two sets of co-operating dies adapted to remove the plastic material from the loader-plate and to form the same upon the grid to be plugged, substantially as set forth.

7. In a machine of the character described, the combination, with the kettle, of the loader-plate having one end thereof provided with openings corresponding to the plugs to be made and having its rear end imperforate, means, as described, for moving said plate across the open end of the receptacle, a support having perforations corresponding to those in the loader-plate and over which said plate may slide, and suitable dies adapted to discharge the loader-plate and to form the plugs upon the grid, substantially as set forth.

8. In a machine for molding separator-plugs for battery elements, the combination, with the kettle adapted to contain a supply of material, of the perforated loader-plate having movement across said kettle for receiving the material, a pair of dies, one at either side of said plate, means for operating said dies through said plate for the discharge of the contents of the latter, and means for reciprocating said plate, substantially as set forth.

9. The combination, with the kettle, of the loader-plate perforate as to one end and imperforate as to the other, a pair of dies having operative movement through and at right angles to said loader-plate, and suitable mechanism for imparting alternate movement to the plate and to the dies, substantially as set forth.

In testimony whereof I affix my signature in presence of two witnesses.

ALBERT FRANKLIN MADDEN.

Witnesses:
GEO. W. PATTEN,
N. T. BRYAN.